Jan. 17, 1956  E. W. CARROLL  2,731,129
FRUIT POSITION INSPECTOR AND SEGREGATOR
Filed Oct. 17, 1949  3 Sheets-Sheet 3

INVENTOR.
ELLSWORTH W. CARROLL
BY
Herbert E. Metcalf
ATTORNEY

United States Patent Office 2,731,129
Patented Jan. 17, 1956

2,731,129

FRUIT POSITION INSPECTOR AND SEGREGATOR

Ellsworth W. Carroll, Redwood City, Calif., assignor to S & W Fine Foods, Inc., San Francisco, Calif., a corporation of California Application October 17, 1949, Serial No. 121,854

18 Claims. (Cl. 198—33)

My invention relates to position inspectors, and more particularly to a means for inspecting and segregating fruit which have been subjected to an indent orientation process, to determine whether or not the indent of the fruit is in a predetermined desired position prior to submitting the fruit to additional processing such as halving and pitting, for example. The invention is particularly useful in conjunction with the processing of peaches for canning purposes.

The invention is suitable for use on a fruit processing machine orientating indented and seamed fruit such as peaches, both as to indent and seam, such as, for example, the machine shown, described, and claimed in my copending application Serial No. 98,260, filed June 10, 1949, now U. S. Patent No. 2,568,947, for Fruit Orientation Devices. The inspector of the present invention can be used as a substitute for the inspector disclosed and claimed in that application.

Among the objects of the present invention are:

To provide a means for inspecting indented fruit for indent position;

To determine whether or not the indent of a fruit is in a desired position;

To provide a means for sensing the position of the stem indent in a fruit which has been subjected to an indent orientating process;

To provide a means for sensing the position of both the seam and indent in a fruit which has been subjected to seam and indent orientation process;

To determine the position of the seam of an indented fruit by probing the indent thereof;

To provide a position inspector for determining whether or not a fruit has been properly orientated after having been subjected to an orientation process, cooperating with means for segregating properly orientated fruit from fruit improperly orientated; and To provide a simple fruit segregation device for use in conjunction with a fruit orientation machine.

Briefly, my invention includes the use of an overhead carrier for fruit, positioned to remove fruit from a main carrier when actuated. Actuation of the overhead carrier is preferably provided by a probe shaped to fit into the indent of the fruit at a predetermined machine position, as the fruit is being progressed by the main carrier, so that friut can be removed from the main carrier in accordance with whether or not the probe enters the indent. Preferably, the main carrier passes the fruit through orientation stages where the fruit is subjected to an indent orientation process prior to being submitted to the probe. As applied to the fruit processing machine of my application cited above, the overhead carrier of the present invention removes fruit from the main carrier that is not properly orientated, leaving on the main carrier only fruit that is properly orientated, to be progressed on this main carrier for further processing, such as action by a halving saw. However, if desired, the properly orientated fruit can be removed from the main carrier by the overhead carrier, when the present invention is used with orientation machines of types differing from that disclosed in the application cited above.

My invention may be more fully understood by reference to the drawings which show one preferred embodiment of the present invention as used in conjunction with the fruit processing machine shown, described, and claimed in the application cited above.

Figure 1:
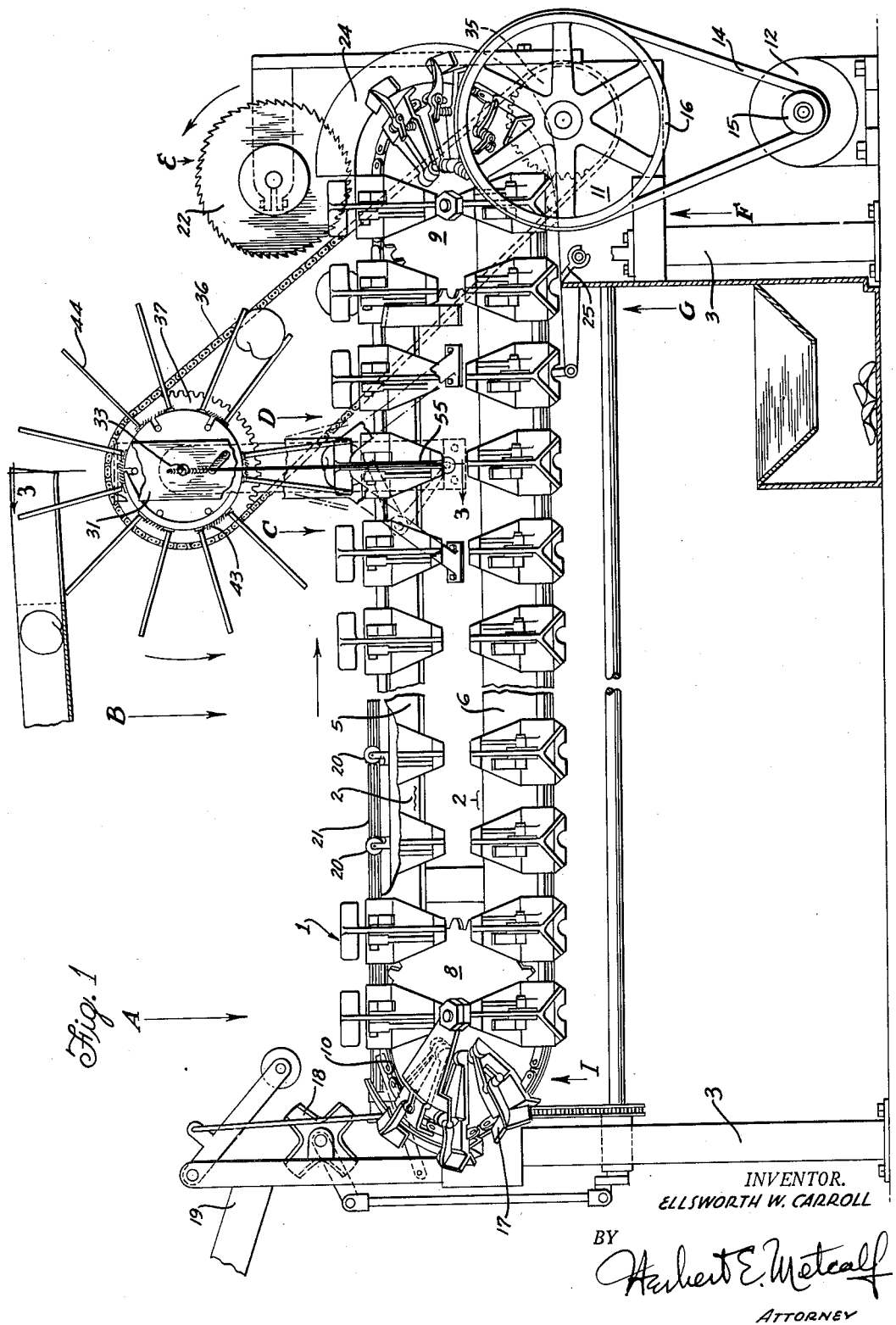
Figure 1 is a side view of the complete fruit processing machine as equipped with the inspector of the present invention.

Before the details of the position inspection means utilized in the complete machine shown in the drawings are described, the main elements of that machine as particularly shown in Figures 1 and 3 will be described briefly.

The machine illustrated is of the endless carrier type in which a plurality of fruit carriages 1 are continuously progressed over a frame 2 supported on frame legs 3.

The frame comprises two upper chain bars 5 and two lower chain bars 6 tied together by end crossbars (not shown). Each pair of upper and lower chain bars 5 and 6 is held in a plane at 90° to the plane of the other pair and at 45° to the ground level, as best shown in Figure 3, the upper chain bars 5 being the closer together.

At the ends thereof each chain bar is cut away to receive an idler sprocket 8 at the front end of the machine, and to receive a drive sprocket 9 at the rear end, these sprockets being positioned to guide an endless roller chain 10 in a position to ride along the top edge of each upper chain bar 5 and along the bottom edge of each of the lower chain bars 6. The two drive sprockets 9 are driven from a gear box 11, which is supplied with power from electric motor 12 through belt 14, motor pulley 15 and gear box pulley 16.

A plurality of the fruit holding carriages 1 are formed from opposed carriage halves 17 oppositely positioned on and attached at uniform intervals to the roller chains 10, and progressed by them in opposing relation along the chain bars. Each carriage half 17 is provided with a base plate 17a on which the fruit may rest.

The carriage halves 17 are separated as they pass along the lower chain plate 6 and then rise to approach each other as a loading stage I–A is reached just prior to progressing horizontally along the top of the upper chain bars 5. The stages are best shown in Figure 1.

At the loading stage I–A the fruit is loaded in proper sequence by a star wheel 18 from a delivery chute 19 into the fruit carriages 1 formed by the opposite carriage halves now in position to retain the fruit, and if the fruit being processed is ungraded, a fruit carriage sizing means (not shown) is operated as the fruit is loaded into the carriage, to insure that the fruit will rotate freely in the carriages.

After a peach is loaded into a carriage 1, the carriages are progressed to enter into an indent orientation stage extending from A to B in which the fruit are revolved by frictional contact with orientation wheels 20, driven by pinion wire 21 and mounted on a synchronous subconveyor (not shown) progressed at the same speed as the chains 10, so that during the orientation stage A–B the fruit will be rotated except when a wheel 20 registers with the stem indent. This registry prevents further driving contact with the fruit so that the fruit stops rotating, with the indent down. During the passage of fruit through stage A–B the orientation wheels are preferably changed in vertical rotational planes, and preferably rapidly, to increase the probability of indent registry with the wheel.

After the wheels 20 are removed from beneath the fruit by termination of the sub-conveyor, the carriages 1 pass through a seam orientation stage B–C. While the fruit is in this stage a member having an indent fitting head (not shown) is applied to the fruit from below and travels with the fruit, oscillating meanwhile to settle the fruit to its deepest extent on the head and thereby to orientate the fruit as to seam or suture plane. As the carriages pass out of the seam orientation stage B–C, the heads return quickly to orientate the following fruit as to seam plane. The fruit then enters an inspection stage C–D.

In this stage C–D, a pilot is inserted into the stem indent, this pilot having a feeler on the upper end thereof sensing the shape of the indent. If the feeler is not operated properly, due to an improperly orientated indent being presented to it, or due to no indent at all being entered, the fruit is gripped by means removing the improperly orientated peach from the carriage and from the machine. Assuming that the inspection has found a properly orientated fruit to be present in the carriage, the fruit is carried next to a halving stage D–E.

As the fruit enters the halving stage D–E, the halves of the carriage are released so that the peach is gripped by the carriage halves, and a rotating circular saw 22 cuts through the vertical central plane of the peach as the carriage progresses. When the peaches are properly orientated, the cut will be made through the tip-indent axis and in the plane of the seam, thus providing substantially identical fruit halves of top grade.

At the end of the halving stage D–E, the cut surfaces of the peach are close together and vertical. The peach halves are then passed into a peach half separation and turning stage E–F, in which the fruit halves are widely separated by splitter plates 24 but are still progressed by the individual carriage halves 17 to a position in which the cut surfaces of the fruit halves are horizontal and facing downwardly. The fruit halves then pass through a pitting stage F–G, during which the cutout peach pit portions are removed from the half by a rotary pitting knife 25 and discharged. The pitted half is then separately discharged and the carriage halves then return along a return stage G–I to rise again and approach each other to receive a whole fruit in the loading stage I–A.

The machine briefly described above is deemed to represent and illustrate for the purposes of the present application only one means out of many that can be used to orientate fruit and bring them to a position where the device of the present invention may operate on the fruit. In consequence, I do not desire to be limited in any way to the use of my present invention on the particular machine shown herein as being representative of a type.

Figure 2:
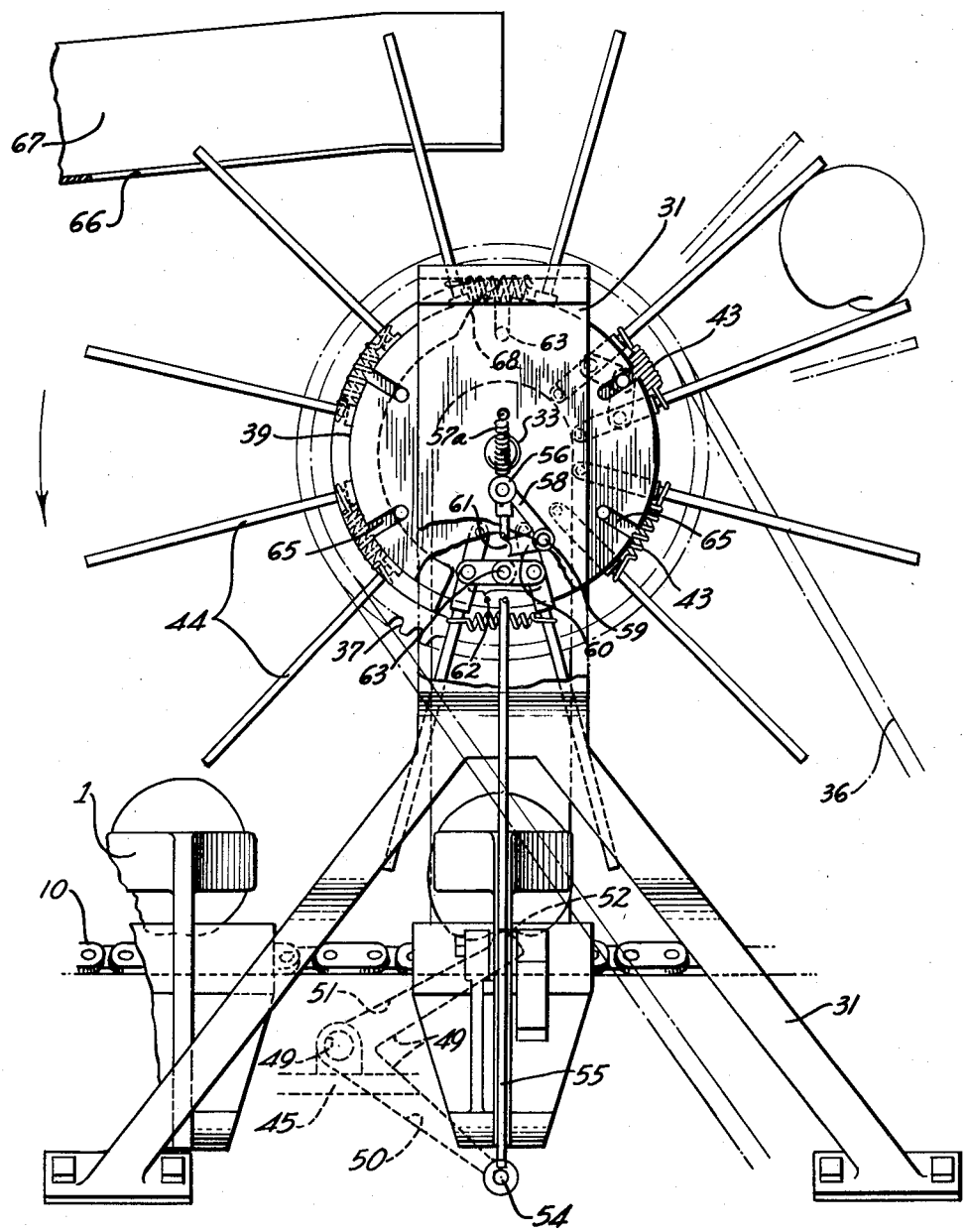
Figure 2 is an enlarged side view of the inspector shown in Figure 1.
Figure 3:
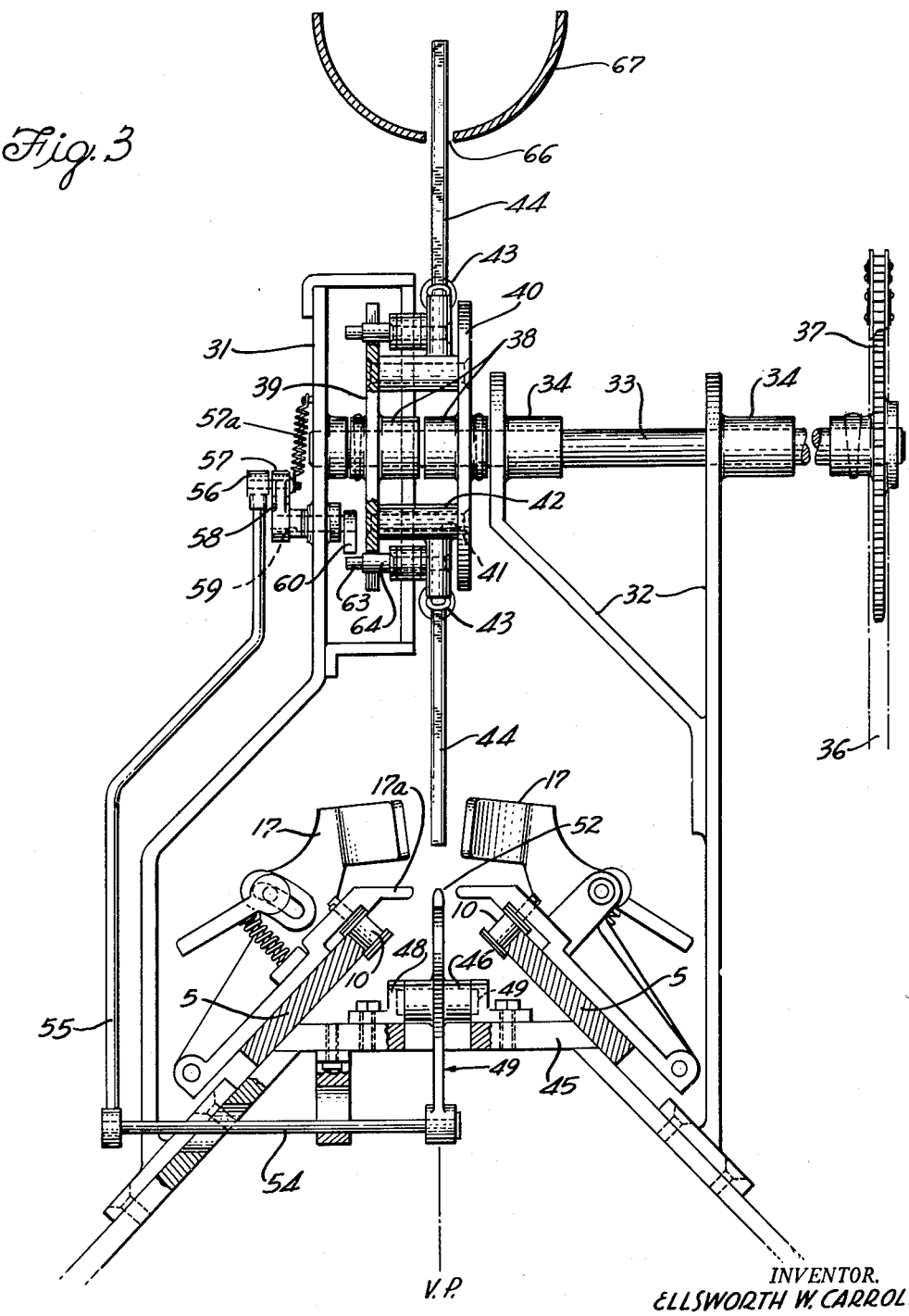
Figure 3 is an enlarged view partly in elevation and partly in cross section, taken as indicated by the line 3—3 in Figure 1.

The inspector and segregator of the present invention will next be described in detail, as best shown in Figures 2 and 3.

At the inspection stage C–D, a pair of brackets 31 and 32 are erected from the upper chain bar 5 to support a main inspector shaft 33, the latter on one side of the machine, passing through spaced outboard bearings 34 supported by the bracket 32. Shaft 33 is driven from gear box 11 by means of gear box sprocket 35, and inspector chain 36 and inspector shaft sprocket 37. On the other side of the machine, inspector shaft 33 is positioned by passing through bracket 31.

Pinned to the inspector shaft 33 between bracket 31 and bearings 34, inspector sleeves 38 are provided, carrying spaced and parallel discs 39 and 40. Circularly positioned around the discs 39 and 40, and joining them at equal radial distances from the axis of the shaft 33 are a plurality of arm pins 41 on each of which is journalled an arm sleeve 42 carrying a pickup arm 44 extending outwardly and radially.

Each pickup arm 44 is long enough to reach almost to the bottoms of the fruit carriages 1 midway between the carriage halves 17, and are shaped to pass between the halves. The pickup arms 44 are even in number and are connected in pairs by tension springs 43 positioned between the paired arms 44 and tending to pull each arm of a pair together. The tension of springs 43 is such that when a fruit is present in a fruit carriage, the fruit can be firmly gripped by a pair of arms, so that the fruit can be lifted out of the carriages by the arm pairs. This gripping of the fruit is controlled by an indent sensing mechanism, next to be described, best shown in Figures 2 and 3.

At the inspection position C–D, the two upper chain bars 5 are connected by a shelf 45 extending across the center plane V. P. of the machine as shown in Figure 3. Below the carriage halves, and parallel to the axis of inspector shaft 33, a probe sleeve 46 is supported to turn on a sleeve shaft 49 mounted in sleeve shaft bearings 48 fastened to shelf 45.

Extending from probe sleeve 46 are two arms forming a bell crank 49, an actuating arm 50 and a probe arm 51, the latter terminating in an indent probe 52 located directly below the inspector shaft 33. Probe 52 is, in case fruit are being processed having both an indent and a seam, elongated in the vertical plane V. P. of the machine, and is preferably shaped to fit the stem indent of the fruit to the deepest extent only when the elongation of the probe registers with the elongation of the indent. Seamed fruit such as peaches have their indents elongated in the plane of the seam, and this shape can be relied on to insure that when the elongated probe does register deeply in the indent, the seam of the fruit will be in the central vertical plane V. P. of the machine, as is desired in this particular machine. In case it is desired to inspect the fruit for indent position only, the probe 52 can be symmetrical instead of elongated.

The probe arm 51 extends upwardly to a point centrally between the base plates 17a of the carriage halves 17 to position probe 52 slightly above the top surfaces of base plates 17a.

The actuating arm 50 extends downwardly to terminate in the central vertical plane V. P. of the machine, and is there connected to a horizontal rod 54 extending laterally through upper chain bar 5. The outer end of rod 54 is connected to an upright latch rod 55, terminating outside of bracket 31 in a latch bearing 56.

Latch bearing 56 is connected to the end 57 of a latch operating arm 58 pivoted to bracket 31. Latch operating arm 58 is also connected, inside of the bracket 31 through pin 59, to a toggle release arm 60 having a toggle pin notch 61 on the end thereof. A light latch spring 57a is stretched between the bracket 31 and the connection of the latch bearing 56 to the latch operating arm 58. This spring 57a serves to lift the probe 52 to the position described previously, but is not so strong that the weight of the fruit will not actuate the linkage downwardly.

Each pair of pickup arms 44 is also connected by a toggle 62 which, when extended, breaks slightly past dead center to hold the arms 44 open against the urge of arm spring 43, as best shown in Figure 2. Each toggle has a central toggle pin 63 that extends outwardly to a point where it can be intercepted, under certain conditions, by toggle notch pin 61. On each toggle pin 63 is positioned a roller 64 riding in radial slots 65 in end plate 39. These slots permit toggle action outwardly but hold the toggle pins 63 in just past dead center position when the pins are bottomed in the slots, and further operate to space arms 44 symmetrically.

In operation, the carriages 1 are progressed continuously. The inspector is rotated continuously and synchronously so that at the inspection position the open pickup arms 44 interleave the fruit in the carriages so that there is an arm in front of the fruit and an arm in back of the fruit as shown in Figure 2. If the probe 52 enters the indent, the toggle release arm 60 carrying the toggle pin notch 61 is kept out of the path of the toggle pin 63 associated with the toggle controlling the arms straddling the peach, and the arms remain open so that the peach is not removed from the carriage and is passed on to the saw 22.

If, however, as the peach reaches the inspection position, the probe 52 does not enter the indent of the peach, the toggle release arm 60 is moved to place the toggle pin notch 61 in the path of the toggle pin 63 as the pin progresses around, and the toggle 62 is forced downwardly past dead center by the camming action of toggle release arm 60, thereby bringing spring 43 into action to cause the peach to be gripped by the pickup arms.

After the gripped fruit reaches the top of the pickup arm arc, the forward arm passes through a slit 66 in a discharge chute 67. As soon as the fruit is well into the end of the chute 67, the toggle 62 is locked open by contact of the toggle pins 63 with the bottom edge of an arcuate toggle setting cam 68 which moves the toggle pin inwardly to locked position, thereby releasing the fruit into the chute 67.

Thus, each fruit on the carrier is inspected, and the improperly orientated fruit are separated from the properly orientated fruit. In the machine above described, chute 67 delivers the improperly orientated fruit back to the input of the machine for reorientation.

I have illustrated my present invention as applied to the complete machine as shown, described and claimed in my co-pending application cited above, where the peach halving saw is an integral part of the complete machine. When the halving means is part of the same machine embodying the inspector of the present invention, the segregating means will be arranged to remove the improperly orientated fruit and leave the properly orientated fruit on the machine to be halved.

However, due to the fact that the segregating means embodied in the present invention removes the fruit from the carrier and holds the fruit in the specific position in which it is picked up, it will be apparent to those skilled in the art that by connecting the probe 52 to the toggle release arm 60 so that the fruit is picked up only when the pilot enters the indent, properly indented fruit can be removed from the carrier in orientated position and carried upwardly in the same manner as the improperly orientated fruit is transported as described above. In this case, to hold the fruit still in properly orientated position, a position maintaining transport means can be provided in the place of discharge chute 65. Such a transport means could well be a carrier having carriages of the general type described herein having halves gripping the fruit from the sides when released by the fore and aft pickup arms 44, for example. Such an arrangement, being merely reciprocal to the preferred system described herein, is deemed to fall within the scope of the present invention as defined by the appended claims.

In like manner, the rotary transport device described herein to remove fruit from the main carrier can be efficiently used to remove all fruit from the main carrier, if desired, and to hold the fruit in the proper relative position for later operations. This type of action is obtained by removing the indent sensing means from contact with the fruit, and operating the indent sensing means by, for example, a cam carried by each pair of carriage halves, shaping the cams to cause each fruit to be grasped and removed from the main carrier. Other modifications of the device as disclosed will be apparent to those skilled in the art.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise the preferred form of putting the invention into effect, and the invention is, therefore, claimed in any of its forms or modifications within the legitimate and valid scope of the appended claims.

I claim:

1. In a fruit orientation machine having a frame supporting a carrier, said carrier progressing a plurality of fruit support means, together with means operating during progression thereof over a horizontal path to orientate fruit in said supporting means with their indents in a predetermined position, a fruit position inspector and segregator comprising a rotary member positioned above said carrier and rotatable on a horizontal axis, a plurality of radially disposed fruit grasping means carried by said member, means for rotating said member in synchronism with said carrier to place a grasping means over a fruit support means in a position to grasp each fruit at a predetermined inspection point, indent sensing means attached to said frame positioned at said point and located to enter an indent only when an indent is in said predetermined position, and means for controlling the grasping means arriving at said inspection point in accordance with movement of said sensing means to cause said grasping means to grasp only the fruit whose indent is not entered by said sensing means.

2. In a fruit orientation machine having a frame supporting a carrier, said carrier progressing a plurality of fruit support means, together with means operating during progression thereof over a horizontal path to orientate fruit in said supporting means with their indents in a predetermined position, a fruit position inspector and segregator comprising a rotary member positioned above said carrier and rotatable on a horizontal axis, a plurality of radially disposed fruit grasping means carried by said member, means for rotating said member in synchronism with said carrier to place a grasping means over a fruit support means in a position to grasp each fruit at a predetermined inspection point, indent sensing means attached to said frame positioned at said point and located to enter an indent only when an indent is in said predetermined position, and means for controlling the grasping means arriving at said inspection point in accordance with movement of said sensing means to cause said grasping means to grasp only the fruit whose indent is not entered by said sensing means, and means for removing grasped fruit from said grasping means at a level above said fruit support means.

3. In a fruit orientation machine having a carrier progressing a plurality of uniformly spaced fruit support means with means operating during progression over a horizontal path to orientate fruit in said supporting means with their indents in a predetermined position, a position fruit inspector and segregator comprising a rotary member positioned above said carrier and rotatable on a horizontal axis, a plurality of radially disposed fruit grasping means carried by said member, means tending to urge said grasping means into a fruit grasping position, means locking said grasping means against said urge in an open position, means for rotating said member in synchronism with said carrier to place an open grasping means over a fruit support means in a position to grasp a fruit in each support means when each support reaches a predetermined inspection point, vertically movable fruit indent sensing means positioned at that point and shaped to enter the stem indent of a fruit, said fruit indent sensing means being located to be contacted by a lower surface of a fruit when at said point means for unlocking the grasping means at said point in accordance with the vertical position of said fruit indent sensing means, and means for relocking said grasping means in open position to release the grasped fruit after said grasping means has removed the fruit from said carrier.

4. In a fruit orientation machine having a carrier progressing a plurality of uniformly spaced fruit support means with means operating during progression over a horizontal path to orientate fruit in said supporting means with their indents in a predetermined position, a position fruit inspector and segregator comprising a rotary member positioned above said carrier and rotatable on a horizontal axis, a plurality of radially disposed fruit grasping means carried by said member, means tending to urge said grasping means into a fruit grasping position, means locking said grasping means against said urge in an open position, means for rotating said member in synchronism with said carrier to place an open grasping means over a fruit support means in a position to grasp a fruit in each support means when each support reaches a predetermined inspection point, fruit indent sensing means positioned at that point, means for unlocking the grasping means at said point in accordance with a movement of said indent sensing means, means for relocking said grasping means in open position to release the grasped fruit after said grasping means has removed the fruit from said carrier, and means for receiving the released fruit.

5. In a fruit orientation machine having a carrier progressing a plurality of uniformly spaced fruit support means with means operating during progression over a horizontal path to orientate fruit in said supporting means with their indents in a predetermined position, a position fruit inspector and segregator comprising a rotary member positioned above said carrier and rotatable on a horizontal axis, a plurality of radially disposed arms mounted on said member and disposed in pairs, means urging each arm of an arm pair together, means locking the arms of each pair apart against the urge of said urging means, the outer ends of the arms of each pair being separated a greater distance than the thickness of fruit being processed, means for rotating said member synchronously with said carrier to place one arm of a pair on each side of a fruit in each supporting means at a predetermined inspection point on said path, vertically movable fruit indent sensing means positioned at said point, and means for unlocking the arms of the pair at the inspection point in accordance with the vertical position of said indent sensing means.

6. In a fruit orientation machine having a carrier progressing a plurality of uniformly spaced fruit support means with means operating during progression over a horizontal path to orientate fruit in said supporting means with their indents in a predetermined position, a position fruit inspector and segregator comprising a rotary member positioned above said carrier and rotatable on a horizontal axis, a plurality of radially disposed arms mounted on said member and disposed in pairs, means urging each arm of an arm pair together, means locking the arms of each pair apart against the urge of said urging means, the outer ends of the arms of each pair being separated a greater distance than the thickness of fruit being processed, means for rotating said member synchronously with said carrier to place one arm of a pair on each side of a fruit in each supporting means at a predetermined inspection point on said path, vertically movable fruit indent sensing means positioned at said point, means for unlocking the arms of the pair at the inspection point in accordance with the vertical position of said indent sensing means, and means for relocking said arms above the level of said carriage.

7. In a fruit orientation machine having a carrier progressing a plurality of uniformly spaced support means with means operating during progression to orientate fruit in said supporting means with their indents in a predetermined position, a position fruit inspector and segregator comprising a rotary member positioned above said carrier and rotatable on a horizontal axis, a plurality of radially disposed arms mounted on said member and disposed in pairs, means urging each arm of an arm pair together, means locking the arms of each pair apart against the urge of said urging means, the outer ends of the arms of each pair being separated a greater distance than the thickness of fruit being processed, means for rotating said member synchronously with said carrier to place one arm of a pair on each side of a fruit in each supporting means at a predetermined inspection point, an indent probe extending into each fruit support as it arrives at said inspection point, said probe being pivoted and urged to move into a fruit indent if said indent is present and down, and a linkage connecting said probe to the arm locking means of the arms on each side of the fruit at said inspection point, to unlock said means only when the indent is not present and down, thereby transferring improperly orientated fruit to said member.

8. In a fruit orientation machine having a carrier progressing a plurality of uniformly spaced fruit support means with means operating during progression over a horizontal path to orientate fruit in said supporting means with their indents in a predetermined position, a position fruit inspector and segregator comprising a rotary member positioned above said carrier and rotatable on a horizontal axis, a plurality of radially disposed arms mounted on said member and disposed in pairs, means urging each arm of an arm pair together, means locking the arms of each pair apart against the urge of said urging means, the outer ends of the arms of each pair being separated a greater distance than the thickness of fruit being processed, means for rotating said member synchronously with said carrier to place one arm of a pair on each side of a fruit in each supporting means at a predetermined inspection point, an indent probe extending into each fruit support as it arrives at said inspection point, said probe being pivoted and urged to move into a fruit indent if said indent is present and down, a linkage connecting said probe to the arm locking means of the arms on each side of the fruit at said inspection point, to unlock said locking means only when the indent is not present and down, thereby transferring improperly orientated fruit to said member, and means for relocking said arms at a level above the level of said carrier to release the grasped fruit.

9. In a fruit orientation machine having a carrier progressing a plurality of uniformly spaced fruit support means with means operating during progression over a horizontal path to orientate fruit in said supporting means with their indents in a predetermined position, a position fruit inspector and segregator comprising a rotary member positioned above said carrier and rotatable on a horizontal axis, a plurality of radially disposed arms mounted on said member and disposed in pairs, means urging each arm of an arm pair together, means locking the arms of each pair apart against the urge of said urging means, the outer ends of the arms of each pair being separated a greater distance than the thickness of fruit being processed, means for rotating said member synchronously with said carrier to place one arm of a pair on each side of a fruit in each supporting means at a predetermined inspection point, an indent probe extending into each fruit support as it arrives at said inspection point, said probe being pivoted and urged to move into a fruit indent if said indent is present and down, a linkage connecting said probe to the arm locking means of the arms on each side of the fruit at said inspection point, to unlock said locking means only when the indent is not present and down, thereby transferring improperly orientated fruit to said member, and means for relocking said arms at a level substantially 180° of said rotary member away from the level of said carrier.

10. In a fruit orientation machine having a carrier progressing a plurality of uniformly spaced fruit support means with means operating during progression over a horizontal path to orientate fruit in said supporting means with their indents in a predetermined position, a position fruit inspector and segregator comprising a rotary member positioned above said carrier and rotatable on a horizontal axis, a plurality of radially disposed arms mounted on said member and disposed in pairs, means urging each arm of an arm pair together, means locking the arms of each pair apart against the urge of said urging means, the outer ends of the arms of each pair being separated a greater distance than the thickness of fruit being processed, means for rotating said member synchronously with said carrier to place one arm of a pair on each side of a fruit in each supporting means at a predetermined inspection point, an indent probe extending into each fruit support as it arrives at said inspection point, said probe being pivoted and urged to move into a fruit indent if said indent is present and down, a linkage connecting said probe to the arm locking means of the arms on each side of the fruit at said inspection point, to unlock said locking means only when the indent is not present and down, thereby transferring improperly orientated fruit to said member, means for relocking said arms at a level substantially 180° of said rotary member away from the level of said carrier, and a chute positioned to receive fruit released by the relocked arms.

11. In combination, a first fruit carrier, a plurality of uniformly spaced pairs of spaced opposed fruit carriage halves on said carrier, means for progressing said pairs over a horizontal path, a shaft positioned vertically above said path, a plurality of fruit transport means uniformly spaced and radially mounted on said shaft to rotate in a vertical plane and directly over said path in a position where said fruit transport means pass between said fruit carriage halves, means for synchronously rotating said shaft to pass successive fruit transport means between successive carriage halves, and means operating selectively to transfer fruit between said carriage halves to said transport means during the intersection of their paths.

12. Apparatus in accordance with claim 11 wherein said fruit transport means each include a pair of spaced arms, and wherein one of said arms is at one side of a fruit with the other arm at the opposite side of said fruit at the transfer position.

13. Apparatus in accordance with claim 11 wherein said fruit transport means each include a pair of spaced arms, wherein one of said arms is at one side of a fruit with the other arm at the opposite side of said fruit at the transfer position, and wherein transfer controlling means are provided to hold said arms apart prior to entering between said carriage halves and to urge said arms against said fruit as said arms progress beyond the intersection of said carriage halves and said arms pairs.

14. Apparatus in accordance with claim 11 wherein said fruit transport means each include a pair of spaced arms, wherein one of said arms is at one side of a fruit with the other arm at the opposite side of said fruit at the transfer position, wherein transfer controlling means are provided to hold said arms apart prior to entering between said carriage halves and to urge said arms against said fruit as said arms progress beyond the intersection of said carriage halves and said arms pairs, and wherein sensing means are provided positioned to contact a surface of a fruit in said halves at said intersection, said sensing means being connected to operate said transfer controlling means upon substantial movement of said sensing means.

15. In combination, a first carrier having a plurality of spaced fruit supports thereon, a second carrier having a plurality of fruit grasping means thereon having grasping and non-grasping conditions, both of said carriers being adapted to transport whole indented fruit, means for synchronously progressing said carriers, said carriers having a predetermined position where successive fruit supports register with successive fruit grasping means, and indent sensing means at said position urged to enter the indent of an oriented fruit in a support at said position and to contact the peripheral surface of an unoriented fruit therein and thereby to move different amounts relative to said support depending upon whether the fruit in said support is oriented or not oriented, said indent sensing means being connected to control the grasping condition of said fruit grasping means in accordance with the amount of movement of said indent sensing means into a support at said predetermined position as determined by fruit contact.

16. Apparatus in accordance with claim 15 wherein said sensing means is elongated and shaped to fit the elongated indents of seamed fruit.

17. Apparatus in accordance with claim 15 wherein said fruit grasping means is shaped to hold said fruit during pick-up from said fruit support in the same position as the fruit was in, while in said fruit support.

18. In combination, a first carrier of whole indented fruit, a second carrier of whole indented fruit, said carriers having intersecting paths, means for synchronously progressing said carriers in the same direction during the intersection of said paths, said fruit being transported in said first carrier with the indents thereof in various positions with respect to said carrier, said positions including a desired position and an undesired position, and means operating to cause a transfer of a whole fruit from said first carrier to the second carrier only when said fruit is in one of said two positions.

References Cited in the file of this patent

UNITED STATES PATENTS

| | | |
|---|---|---|
| 1,654,091 | Peiler | Dec. 27, 1927 |
| 2,112,119 | Rowe | Mar. 22, 1938 |
| 2,232,210 | Carroll | Feb. 18, 1941 |
| 2,385,882 | Rolker | Oct. 2, 1945 |
| 2,393,188 | Reynolds | Jan. 15, 1946 |
| 2,649,880 | Ewald et al. | Aug. 25, 1953 |

FOREIGN PATENTS

| | | |
|---|---|---|
| 347,166 | Great Britain | Apr. 23, 1931 |